United States Patent
Guzikowski

[11] Patent Number: 5,869,109
[45] Date of Patent: Feb. 9, 1999

[54] MULTI-MOLD CLOSURE SYSTEM

[75] Inventor: Gary R. Guzikowski, Franklin, Wis.

[73] Assignee: Norstar Aluminum Molds, Inc., Cedarburg, Wis.

[21] Appl. No.: 942,651

[22] Filed: Oct. 2, 1997

[51] Int. Cl.[6] ............................. B29C 33/20; B29C 41/04
[52] U.S. Cl. ....................................... 425/451.9; 425/434
[58] Field of Search .................................. 425/434, 435, 425/450.1, 451.9

[56] References Cited

U.S. PATENT DOCUMENTS

| | | | |
|---|---|---|---|
| 2,298,057 | 10/1942 | Kelm | 425/451.9 |
| 3,293,698 | 12/1966 | Bavers | 425/434 |
| 3,611,506 | 10/1971 | Schroeder | 425/434 |
| 3,801,255 | 4/1974 | Meyer et al. | 425/434 |
| 4,043,737 | 8/1977 | Greenberg | 425/434 |
| 4,350,481 | 9/1982 | Corea et al. | 425/434 |
| 5,094,608 | 3/1992 | Piazza et al. | 425/434 |
| 5,306,564 | 4/1994 | Guzikowski | 425/408 |
| 5,529,481 | 6/1996 | Guzikowski | 425/434 |

*Primary Examiner*—James P. Mackey
*Attorney, Agent, or Firm*—Quarles & Brady

[57] ABSTRACT

A molding apparatus has a first support with two vertical posts, a first set of two mold halves, and a grip positioned thereon. There is also a second support having positioned thereon a second set of two mold halves. A clamp bar is positioned over the two supports in a vertically movable manner so as to retain the sets of mold halves together to form two mold cavities. The clamp bar interfits and rides along the vertical posts and so as to simultaneously clamp multiple molds closed. There is also a lock for locking the clamp bar to the vertical posts, thus clamping the molds closed without the need for nuts or bolts. A hydraulic clamp is used to assist in moving the mold halves into a tight sealing position.

6 Claims, 8 Drawing Sheets

MULTI-MOLD CLOSURE SYSTEM

BACKGROUND OF THE INVENTION

This invention relates to rotational molding systems in which there are multiple pairs of mold halves that are repetitively opened and closed. More particularly, it relates to a system for sealing and locking such multiple pairs of mold halves together, without the need for tightening of attachment nuts.

Various types of rotational molding systems are well known. For example, U.S. Pat. Nos. 5,306,564 and 5,529,481 describe mold systems where two or more pairs of mold halves can simultaneously be brought together to form mold cavities in which molded items are cast.

Meltable particulate (usually a plastic such as polyethylene) is placed inside each cavity, each mold is closed and placed in a furnace where it is heated (or the molds are otherwise heated), and each mold is rotated and sometimes also rocked.

The particulate melts and adheres to the internal surface of each cavity. After cooling, each mold is opened and the molded items are removed. This type of molding is particularly well suited for items that have large hollows in them (e.g. plastic gasoline containers).

In high production facilities problems can arise in connection with the opening and closing of such molds. As taught in U.S. Pat. No. 5,529,481, a system is needed to hold the mold halves tightly together during the molding process. This is particularly important because of the range of movement of the molds during molding, and because if the mold halves are not tightly held together plastic can seep into the joint between mold halves, thereby creating unwanted flashing (and wasting plastic).

To achieve a tight joint the art had previously used various bolting systems. However, such bolting systems were labor intensive and time consuming to use. In some cases, workers experienced repetitive strain injuries due to the need for repetitive turning of bolts and/or nuts.

Moreover, if the bolts/nuts were not evenly tightened there could be uneven wear at the mold joint and/or instances of seepage at the joint. While patents such as U.S. Pat. No. 5,306,564 disclosed a system to reduce the number of bolts required, that system still required some bolts. Even with that system there was some concern regarding achieving even clamping pressure on opposite sides of the molds, and when comparing one mold pair to another.

It can therefore be seen that a need exists for an improved multi-mold closure system.

BRIEF SUMMARY OF THE INVENTION

In one aspect the invention provides a molding apparatus. There is a first support having two vertical posts, a first set of two mold halves, and a grip means positioned thereon. There is also a second support having positioned thereon a second set of two mold halves.

The system also has a clamp bar positionable adjacent a support to drive the mold halves together into a sealed position so that they form two mold cavities. The clamp bar has means for riding along the vertical posts.

There is also a locking means for locking the clamp bar to the vertical posts when the clamp bar is retaining the sets of mold halves in sealing contact with their respective other mold halves.

Preferably, the vertical posts each have a radial hole in them and the locking means has pins projecting into the vertical post holes. The locking means can also include a pivotable lever positioned between the vertical posts that can simultaneously move both pins from a locking position to an unlocked position.

In another preferred aspect, the grip means is a vertical post having a recess therein. There can also be a hydraulic clamp suitable to provide clamping pressure between the grip means and clamp bar.

Also, the vertical posts can be mounted on springs so as to make the contact between the mold halves more gentle (thereby reducing premature wear damage at the joint between the molds).

It will be appreciated that the present invention provides an enclosure system which tightly seals multiple sets of mold halves together simultaneously, without the need for tightening any nuts. The clamping pressure is substantially even for each pair of mold halves.

A primary object of the invention is therefore to provide a molding system of the above kind which provides a secure clamping of multiple sets of pairs of mold halves together without the need for tightening nuts or bolts.

Another object of the invention is to provide a molding system of the above kind which reduces the amount of time needed to open and close multiple molds.

Yet another object of the invention is to provide a molding system of the above kind which inhibits seepage of mold contents through joints between the mold halves during molding.

Still another object of the invention is to reduce the incidence of operator repetitive strain injury.

Still other objects and advantages of the present invention will become apparent from examination of the preferred embodiment and claims which follow.

DETAILED DESCRIPTION OF THE INVENTION

Figure 1:
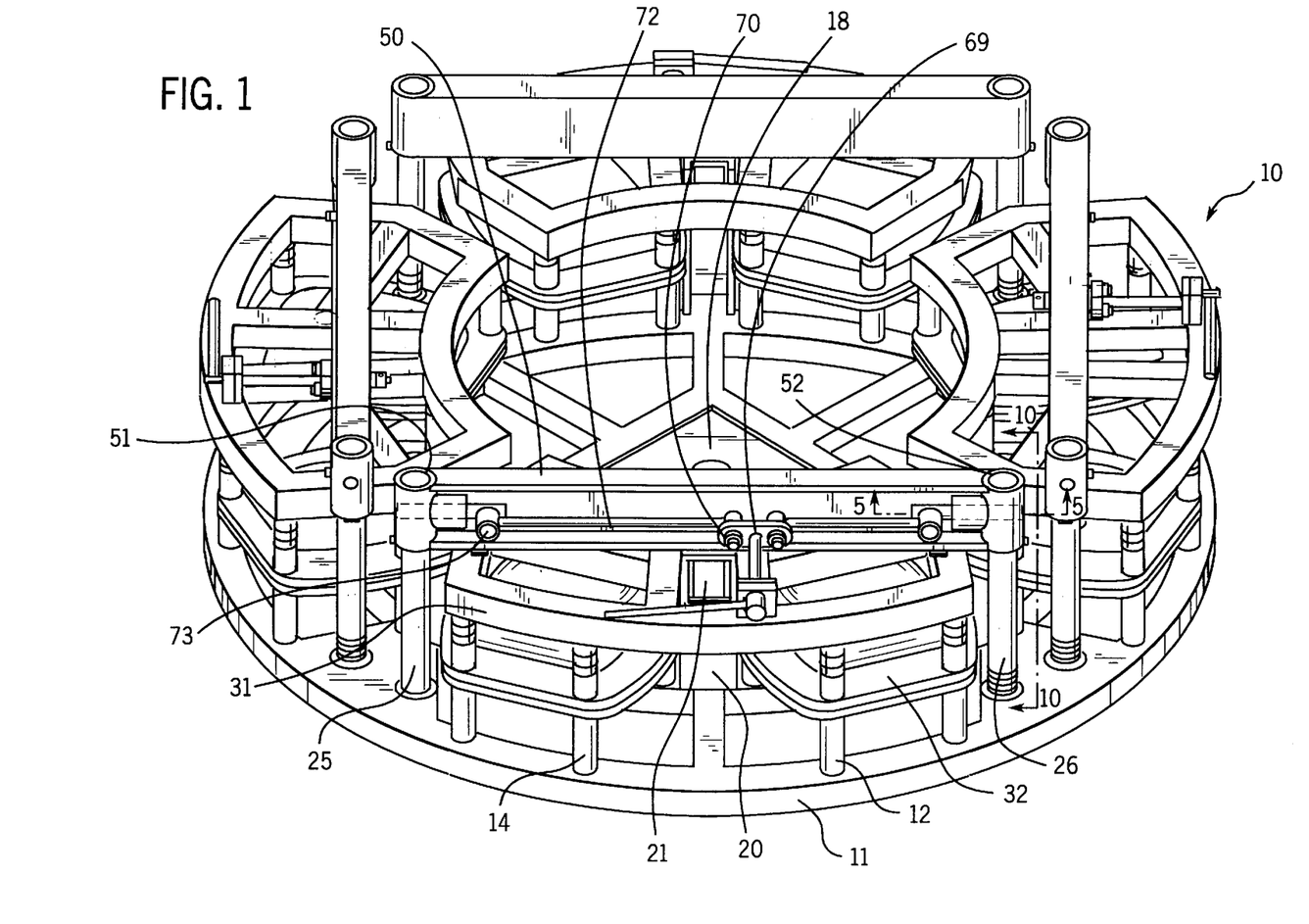
FIG. 1 is perspective view of an embodiment of the present invention, where the system has been installed on a rotational mold spider (with three other of such systems)
Figure 2:
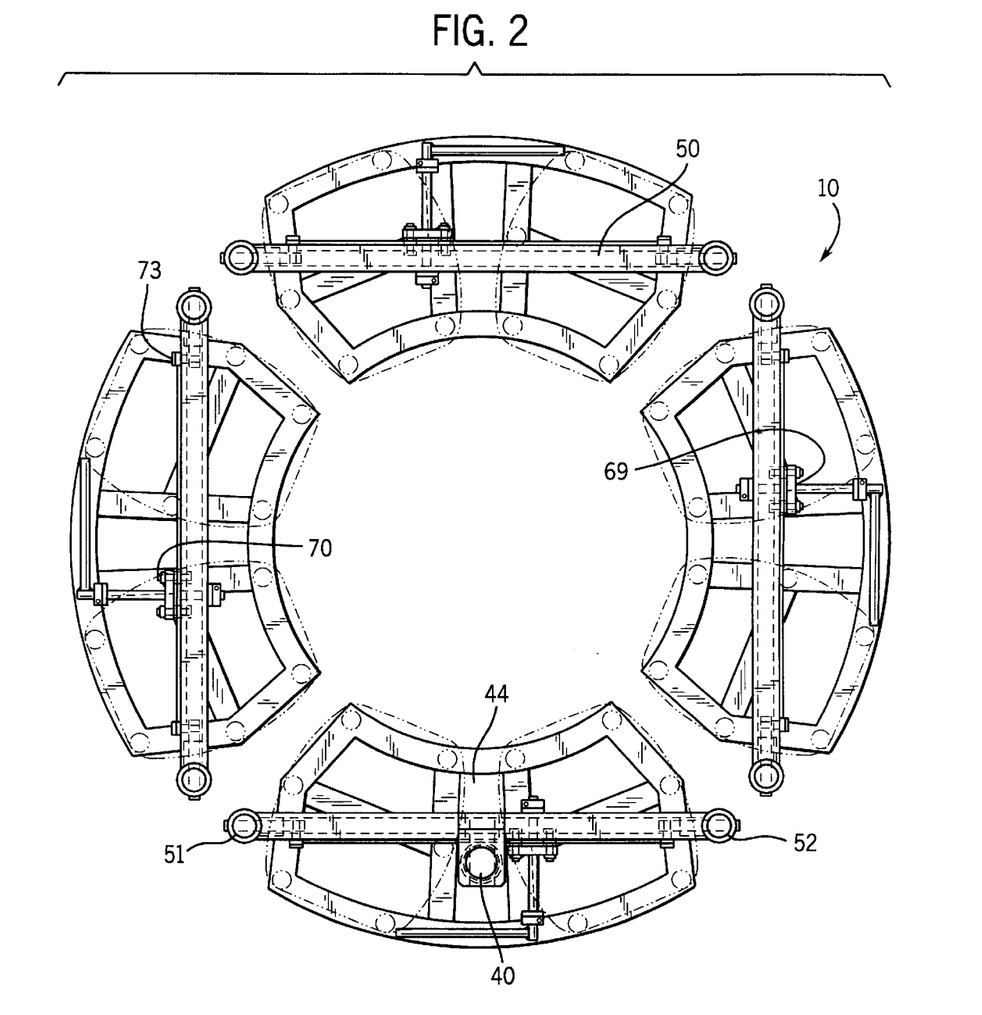
FIG. 2 is a somewhat schematic top plan view of the system of FIG. 1, with a hydraulic clamp being used with one of the four systems.
Figure 7:
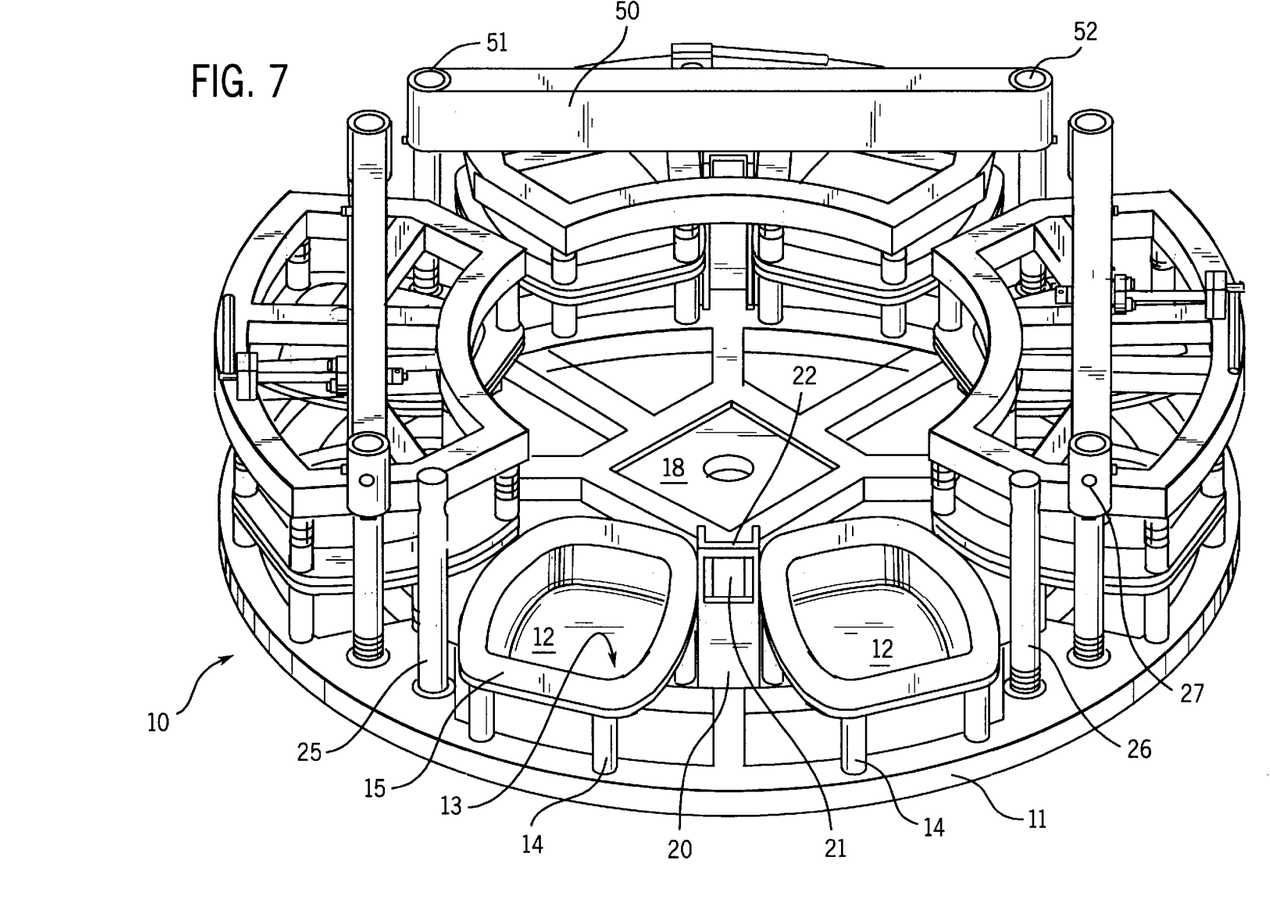
FIG. 7 is a view similar to FIG. 1, albeit with the front system disassembled to show only the parts permanently attached to the spider support.

FIGS. 1 and 7 show the present molding apparatus (generally 10). There is a circular spider support 11 on which is mounted bottom mold halves 12. Each bottom mold half 12 has an internal cavity 13, leg supports 14, and a sealing edge 15. The mold halves 12 are permanently attached to the spider 11 by known techniques (e.g. welding; bolting).

Spider 11 has the usual central attachment region 18 which is connectable to a conventional rotational molding apparatus (not shown) that rotates and rocks the spider (and thus the molds).

Two lower mold halves 12 are grouped together in each mold system, with a grip means 20 positioned therebetween. Grip means 20 is preferably a post having at its upper end a rectangular hole 21 below a top edge 22. One such post 20 is positioned between each pair of lower mold halves 12.

Figure 10:
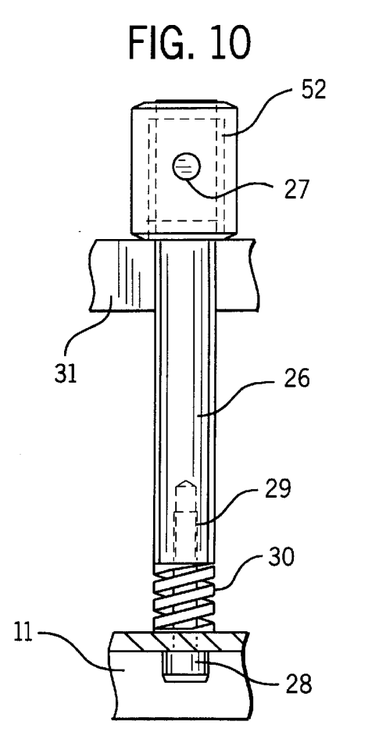
FIG. 10 is an enlarged view, partially in section, taken along line 10—10 of FIG. 1.
Figure 11:
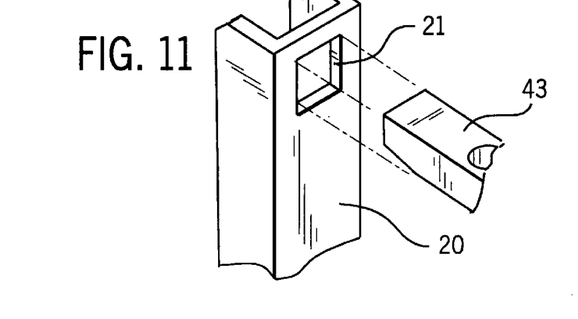
FIG. 11 is a schematic perspective view of a clamp element being inserted into a grip means.

Also connected to the spider 11 are two vertical posts 25 and 26 that are positioned on opposed lateral sides of each pair of lower mold halves 12. Each post 25, 26 has a horizontal hole 27 through it, and (as shown in FIG. 10) is connected at its lower end to the spider 11 by a bolt 28 passing into a threaded bore 29 in the bottom of the post.

Spring 30 is positioned around the bolt 28. The above construction permits the vertical post to move gently vertically against spring pressure, depending on the amount of downward force on the vertical post.

Figure 3:
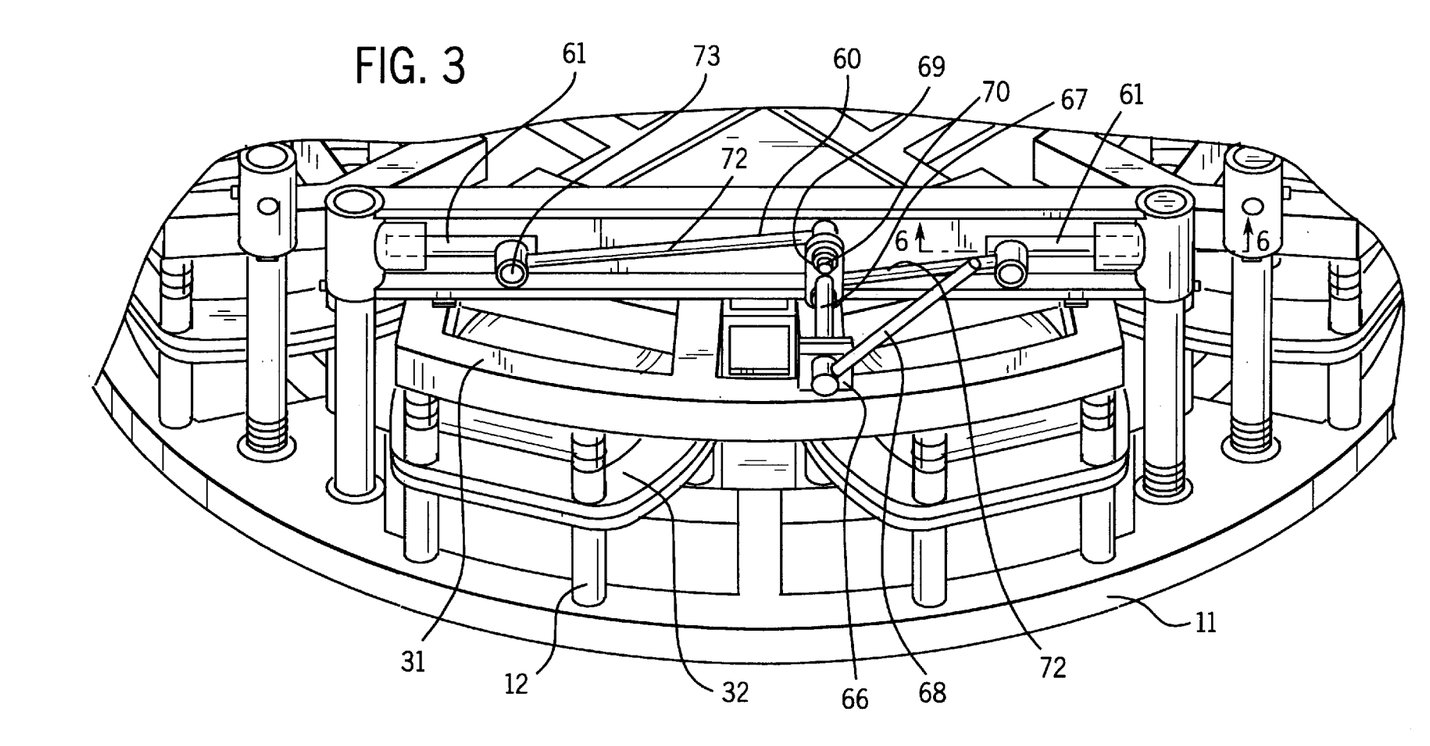
FIG. 3 is a view similar to FIG. 1, but with the view enlarged and focused on one of the systems, and with that system shown in an unlocked position.
Figure 4:
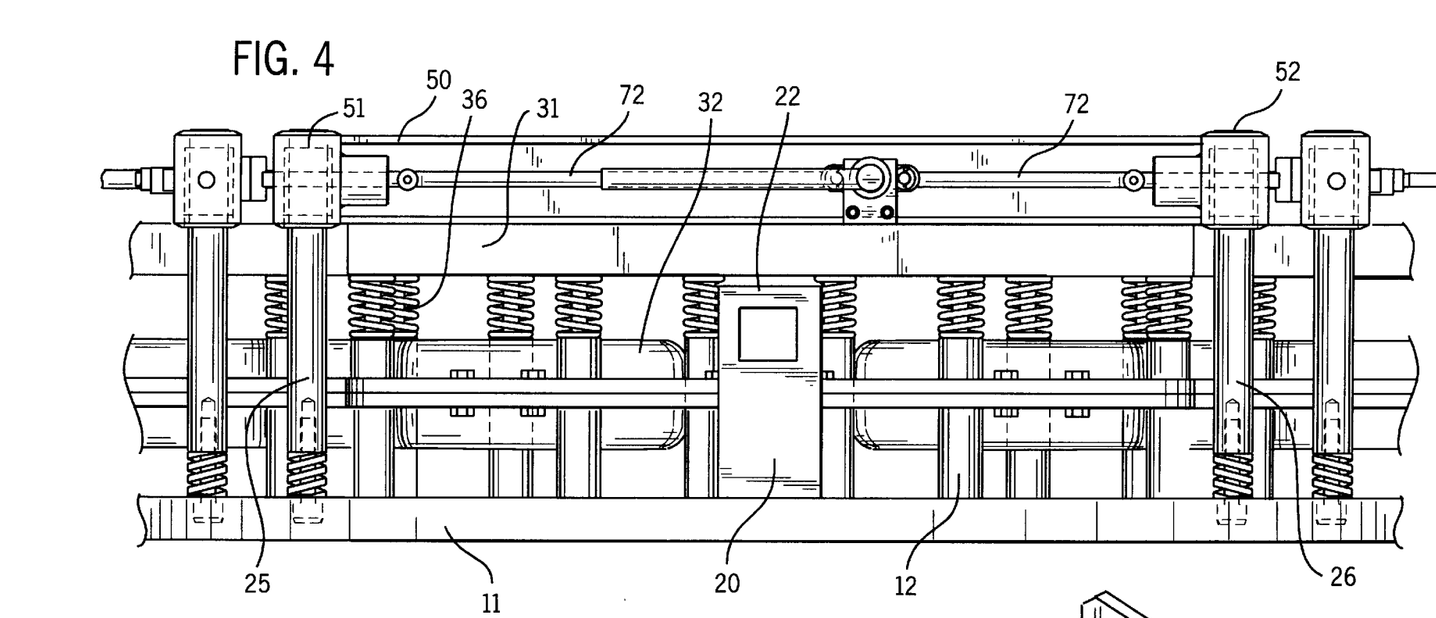
FIG. 4 is a front elevational view of the FIG. 1 assembly.

Turning now to FIG. 3, a second support 31 is provided which has mounted thereon two top mold halves 32, in a spaced apart fashion. The upper mold halves 32 are similar in construction to the lower ones in that they also have four legs, an internal cavity and a sealing edge. When the support and upper mold halves are aligned over the lower mold halves, all the mold halves form internal mold cavities (see generally the alignment shown in FIG. 4). Upper mold halves 32 are preferably attached to the second support 31 via shock absorbing type connection (with springs 36) similar to the vertical post shock absorbing assembly (28–30).

Figure 8:
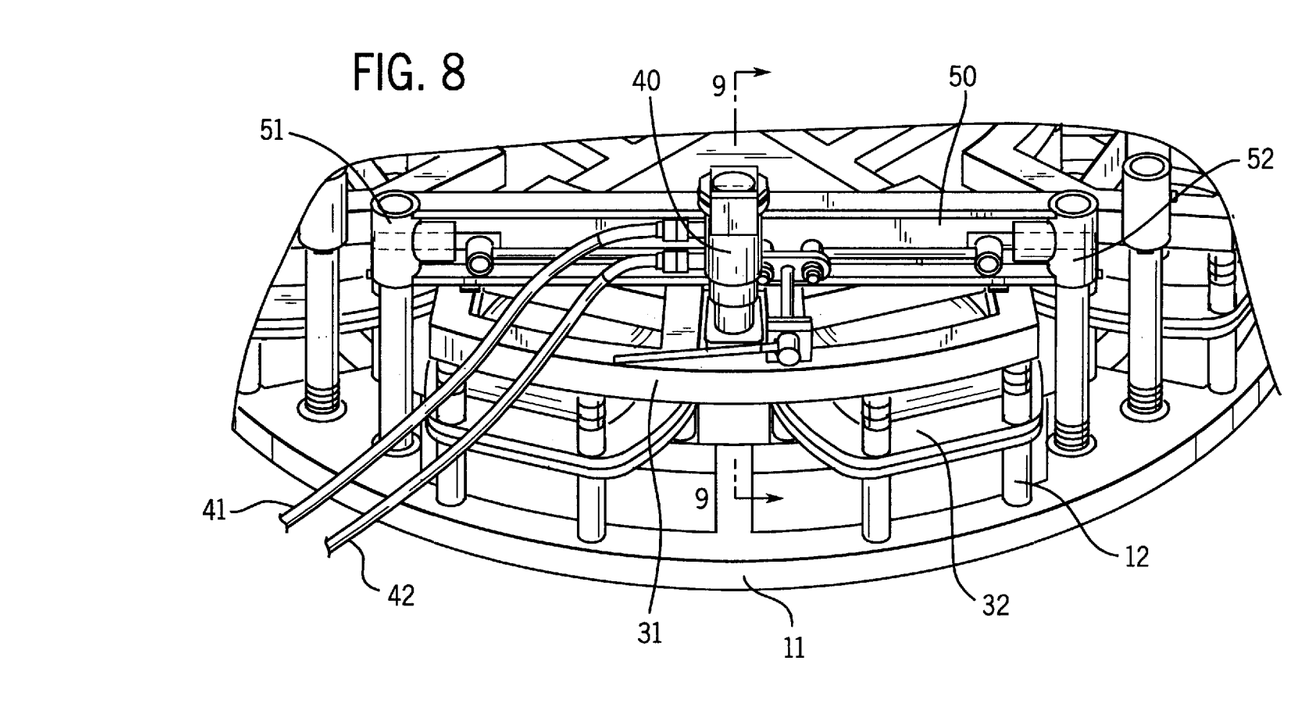
FIG. 8 is a view similar to FIG. 3, but with the system being used with a hydraulic clamp.
Figure 9:
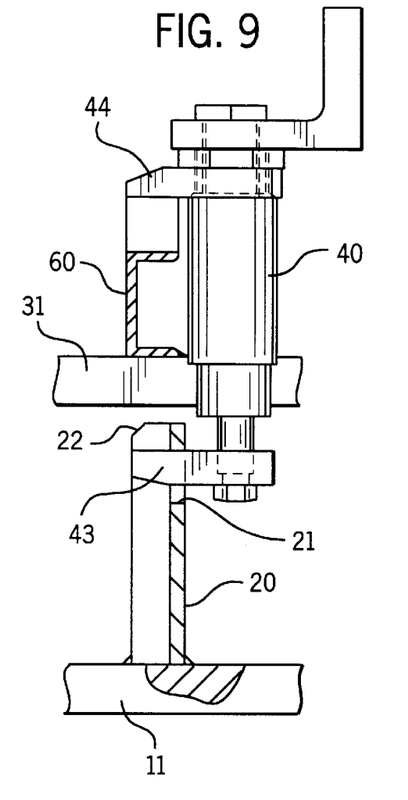
FIG. 9 is an enlarged view, partially in section, taken along line 9—9 of FIG. 8.

As best appreciated from FIGS. 8 and 9, a hydraulic clamp 40 is provided. It can be attached to air/oil inlet and outlet lines 41 and 42. Lower tongue 43 fits into rectangular hole 21 of post 20 when desired, with the upper tongue 44 resting on a clamp bar 50.

The clamp bar 50 has cylindrical structures 51/52 at its ends that are suitable to fit over and ride on the tops of vertical posts 25 and 26. The internal portion of the clamp bar is preferably hollow, with the downward edge of the clamp bar being optionally open.

Figure 5:
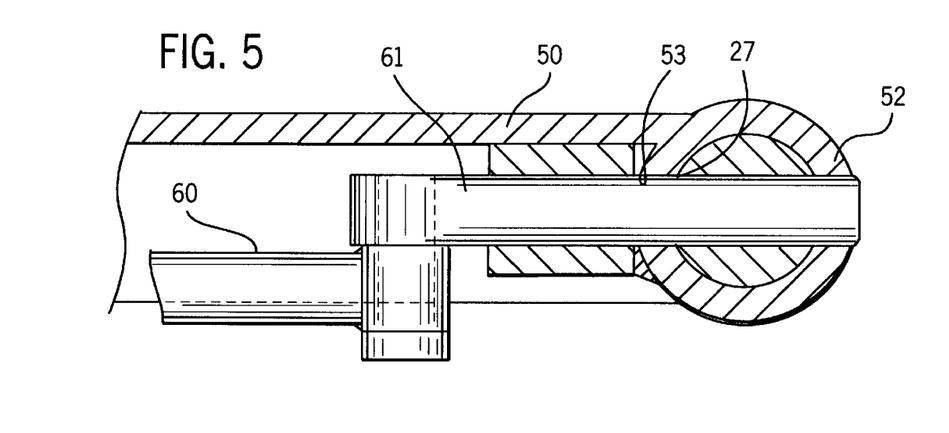
FIG. 5 is a cross-sectional view taken along line 5—5 of FIG. 1, showing a locking pin in the locked position.
Figure 6:
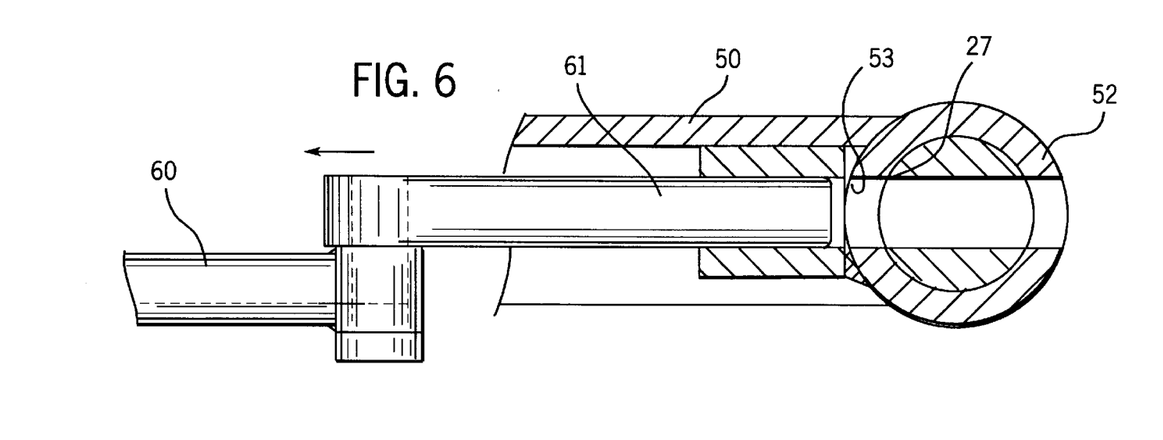
FIG. 6 is a cross-sectional view taken along line 6—6 of FIG. 3, showing a locking pin in the unlocked position.

As shown in FIGS. 5–6, cylindrical structure 51 and 52 have a hole 53 that is alignable with the corresponding holes 27 on the vertical posts. Locking means 60 are also provided to interfit with these holes.

As will be best appreciated by examining FIGS. 1, 3, 5, and 6, the locking means 60 is designed to move pins 61 into the corresponding holes 53/27 in the clamp bar and vertical posts. In the position shown in FIG. 6, pins 61 are in the unlocked position, where downward movement of the clamp bar (e.g. in response to the hydraulic clamp) can cause movement of the vertical post down against spring pressure.

Note that the vertical posts 25, 26 guide the movement of the clamp bar so as to provide even pressure along each sealing joint as clamping takes place. When this occurs, the pins can be moved to the FIG. 5 position. The clamp bar then holds the mold halves tightly together and the hydraulic clamp is no longer needed.

To disassemble the clamp structure after molding (and open the molds), one must to decouple the clamp bar from the vertical posts. This can be achieved by causing the pins to move out of the locking position back to the FIG. 6 position.

A preferred locking means 60 is shown in detail in FIG. 3. There is a block 66 through which a pivot bar 67 extends. The pivot bar is in turn linked to a pivot handle 68. Swinging of the pivot handle 68 (e.g. from the FIG. 1 position to the FIG. 3 position) rotates the pivot bar 67.

Pivot bar 67 is also linked to a coupler 69 for rotational movement therewith. The coupler retains two pintles 70 that can rotate in holes in the coupler ends. Rotation of the coupler will cause linked bars 72 to be moved between the FIG. 1 position and the FIG. 3 position.

There is another rotational linkage 73 between bars 72 and pins 61. When the pivot handle 68 is in the FIG. 1 position, the system is locked. When the pivot handle is in the FIG. 3 position, the system is not locked.

In operation, a meltable plastic particulate is inserted in each open mold cavity (see e.g. the open mold in FIG. 7). The second support 31, with its two open upper mold halves 32, is then positioned as shown in FIG. 3. The clamp bar is then positioned as shown in FIG. 3. At this point, holes 53 on the clamp bar 50 are somewhat higher than holes 27 on the vertical posts 25, 26.

A hydraulic clamp can then be positioned as shown in FIG. 8, with the lower clamp tongue inserted in the rectangular hole 21, and the upper clamp tongue positioned on top of the clamp bar. By activating the hydraulic clamp, the clamp bar is dragged downwards towards the spider, against spring pressure. This then causes a tight mold seal between all of the mold halves in their respective pairs, and permits an alignment of the respective holes 53, 27 on the clamp bar and the vertical posts 25, 26.

At this point, the pivot handle 68 can then be swung to the FIG. 1 position, thereby driving the locking pins into the vertical posts. The hydraulic clamp can then be removed, and the spider system can be used for rotational molding in the usual fashion.

When the molding is completed, the pivot handle 68 can be swung back to the FIG. 3 position, and the clamp bar can be removed (followed by separation of the mold halves). If desired, the hydraulic clamp can be used during this process to facilitate removal and/or pivoting of the pivot handle.

It will be appreciated from the discussion above that no bolts or nuts need to be repetitively tightened or loosened when using this system. Further, the system creates a relatively even clamping pressure across both molds. The springs provide a gentle closure, thus reducing wear and ultimately leakage.

What has been described above is the preferred embodiment of the present invention. Other embodiments are also within the intended scope of the claims. For example, the clamping bars could close more than two sets of mold halves simultaneously. Also, the locking system need not be a pivot bar. In this regard, a pin could be separately manually slid into each post (rather than having a single device operate both pins).

As such, the claims which follow should be looked to in order to judge the full scope of the invention.

I claim:

1. A molding apparatus, comprising:
    a first support having two vertical posts, a first set of two mold halves positioned between the vertical posts, and a grip member positioned on the support;
    a second support having positioned thereon a second set of two mold halves;
    a clamp bar positioned on the vertical posts adjacent the second support so as to extend across both said mold halves of said second set so as to be able to drive the respective sets of mold halves into sealing contact with each other due to clamping pressure of the clamp bar, so as to form two mold cavities, the clamp bar having means for riding along the vertical posts;

a clamp engageable with said clamp bar, suitable to provide clamping pressure by gripping on the grip member so as to clamp between the grip member and the clamp bar; and a locking means for locking the clamp bar to the vertical posts when the clamp bar is retaining the sets of molding halves in said sealing contact.

2. The molding apparatus of claim 1, wherein the vertical posts each have a radial hole therein and the locking means comprises pins projectable into the vertical post radial holes.

3. The molding apparatus of claim 2, wherein the locking means further comprises a pivotable lever that can simultaneously move both pins from a locking position to an unlocked position.

4. The molding apparatus of claim 3, wherein the lever is positioned between the vertical posts.

5. The molding apparatus of claim 1, wherein the grip member is a vertical post on the first support having a recess therein, wherein a portion of the clamp is retained in the recess.

6. The molding apparatus of claim 1, wherein the clamp is a hydraulic clamp.

* * * * *